Patented Apr. 25, 1933

1,906,181

UNITED STATES PATENT OFFICE

RAY RILEY, OF PATERSON, NEW JERSEY, ASSIGNOR TO AMERICAN ZEOLITE CORPORATION, OF NEW YORK, N. Y., A CORPORATION OF DELAWARE

COMPOUND SILICATE GELS AND METHODS OF MAKING THE SAME

No Drawing.   Application filed December 2, 1930.   Serial No. 499,608.

This invention relates to compound silicate gels and methods of making the same; and it comprises a dried gel, usually in granular form, with each granule representing an intimate union of wet gels from different sources, one such gel being made in an alkaline medium and another being made and finished in a non-alkaline medium; the two gels in preparations intended for water softening being both usually composed of silica, alumina and more or less alkali; and it also comprises a process wherein a gel is made in an alkaline medium, as by mixing a solution of silicate of soda with one of aluminate of soda, the resultant gel being more or less washed and a second gel is made by precipitation from a silicate of soda solution with a saline solution of a metal oxid, such as an aluminum sulfate, said second gel being finished in a more or less acid reacting condition, the two wet gels being then intimately commingled, and the mixtures being pressed, dried and granulated, with a washing treatment before or after granulation; all as more fully hereinafter set forth and as claimed.

Base exchange silicates and zeolites are made for water softening and other purposes. In one way of preparing these materials, usually known as the wet way, solutions of silicate of soda are mixed with solutions of alumina or another metal oxid, such as ferric oxid. The metal oxid solution may be alkaline, as in the case of aluminate of soda or nearly neutral chemically, as in the case of sulfate of alumina. The solutions may be dilute enough to afford a mother liquor with a separation therefrom or they may be strong enough to cause the whole liquid to set to a jelly. In any event, the precipitate is a gel. The wet gel is sometimes dried without removal of mother liquor and subsequently granulated with or without washing. With a dried gel containing soluble matters from the mother liquor in the right amount and of the right character, exposure to water causes a breaking up into granules so that granulation and final washing may be combined. More often some liquor is expressed from the wet gel before drying.

As a rule the silicate gels made from alkaline solutions of metal oxids such as sodium aluminate are more reactive chemically than are gels made from solutions of metallic salts such as aluminum sulfate. The latter gels, however, usually are the more rugged physically of the two types of gel. Both properties are desirable and it is an object of the present invention to produce compound gels having both the higher reactivity of the first type and the greater ruggedness of the second type.

In the base-exchange softening of water by percolation under pressure through a granular bed with periodic cleaning and with regeneration of the bed by brine, the base exchange material is subjected to considerable physical wear. Among the attained objects of the present invention is the production of a base exchange silicate gel which, without sacrifice of base exchanging activity, is highly resistant to pressure strains and to the abrasive action of flowing liquids—a rugged product which meets the requirements of the water-softening process.

I have found that when a wet gel is made from solutions of sodium silicate and sodium aluminate and another wet gel is made from solutions of sodium silicate and aluminum sulfate, observing certain conditions of alkalinity and acidity, and the two wet gels are pulped and mixed and then pressed and dried, a compound dry gel is produced which possesses a base exchange or chemical reactivity about that of the best silicate-aluminate gel while having mechanical strength and resistance to abrasion about that of the best silicate-sulfate gel. These desirable properties result when the aluminate gel, which for convenience may be called an A-gel, and which is always made in an alkaline medium, is mixed with a sulfate gel, or "B-gel", formed primarily in an alkaline medium, but after a period of ageing made slightly acid by an addition of a quantity of aluminum sulfate solution to the already formed B-gel in a pulped condition. The A-gel and the final B-gel are pulped and intimately mixed by agitation together and some form of union or combination between the two suspended gels takes place. How far such action goes is uncertain and it may be that the phenomenon comprises surface reactions between the particles of the two gels. Whatever the correct theory of the compound gel formation may be, the product acts like a homogeneous body for the present purposes. It combines high base exchange activity with great mechanical strength.

In making the compound gel, as a rule I do not mix the wet gels until after they have been washed sufficiently to remove much of the mother liquor. As a rule, washing should be more extensive with the A class gels since it is more important to remove alkali than neutral salines. I find that I obtain a better product in most cases by postponing mixing of the two gels until some washing has been effected. In most cases, however, and particularly where the mixed gel is to be dried and then treated with water to make it snap into fragments, extensive washing prior to drying is not advisable. Pressing nearly always is advisable since it is more economical to remove most of the liquor by pressure and lessen the work in drying.

The behavior of the gels on drying is largely influenced by the amount and character of the mother liquor present. Where a gel is to be dried and then granulated by the action of water, the amount of caustic soda in the dry material to a certain extent controls the size of granules and the effectiveness of the granulating operation. Too much and too little soda are undesirable. As a general rule I do not regard neutral salts in the mother liquor as so useful although in some relations a certain amount is desirable. For making some types of water softening zeolite, for example, a certain amount of sodium sulfate in the mother liquor will give crystal cavities in the dried and washed cake, surperadding a different type of porosity to the final product. Sometimes this is useful.

It has been found that fairly concentrated solutions of the reagents can be used in forming both the A-gel and the B-gel. These concentrations are advantageously so chosen as to permit a uniform mixture of the reagent solutions before gelation begins, but some latitude in this respect is permissible. The pulping of the separate gels in the present invention after their formation has an effect of evening out lack of uniformity of the gels as formed. What, in prior processes, would be regarded as premature and deleterious gel formation is permissible in the operation of the present invention. However, there is a certain advantage in having the reagent solutions fairly dilute. Ordinarily, in making the A-gel the solution of sodium silicate is of a concentration corresponding to 7 to 10° Bé. gravity and the sodium aluminate solution is somewhere between 1 and 4° Bé. The B-gel reagent solutions are usually sodium silicate of 6 to 8° Bé. and aluminum sulfate of 4 to 6° Bé.

The relative proportions of the two gels may be varied within wide limits without unduly affecting the properties of the product. On the basis of their respective alumina contents, a 2.5:1 ratio between the A-gel and the B-gel gives an excellent product. As an example, a pulped gel made from solutions of sodium silicate and of a sodium aluminate containing 100 pounds of $Al_2O_3$ is mixed with a gel made from sodium silicate and aluminum sulfate containing 40 pounds of $Al_2O_3$. Using the common commercial materials the ratio of aluminate alumina to sulfate alumina may vary between 1:1 and 6:1.

I find it advantageous to work with solutions at ordinary room temperatures, say between 60 and 70° F., in making both the A-gel and the B-gel and in mixing the two gels. At higher temperatures than these, gelation occurs in a shorter time and then it is advisable to work with more dilute solutions. Lower temperatures permit greater concentrations in the reacting solutions. During the washing it is desirable to have the temperature of the washing water somewhat higher than 70° F., say from 75 to 80° F.

The final dried product as a rule behaves as if it were homogeneous. This final material possesses a remarkable and distinctive physical structure, being highly porous and honeycomb-like but with submicroscopic pores. This gives it at once an enormous area of effective surface and a hard and rigid structure, well adapting the final product to extensive use in water softening.

While the process and the compound gels produced have been described with specific reference to alumina compounds having particular applicability to water softening, solutions of the oxids of other metals and combinations of metal oxids may be used in forming the separate gels and the compound gel product may be used for other purposes than water softening, for example, as catalysts of chemical reactions and as carriers for catalysts. Among the alkaline compounds that may be used in partial replacement of aluminates in making A-gels, are vanadates, molybdates, chromates, tungstates, borates, and uranates. In making the A-gels practically any metal compound soluble in an alkali solution may be used in greater or less proportion. Among the non-alkaline metallic salts that may be used in place of or in addition to aluminum sulfate in making B-gels are chlorids, sulfates and nitrates of iron, manganese, nickel and cobalt. Almost any heavy metals desired as components of a B-gel may be quite conveniently added as their ordinary salts to the solution which is mixed with the sodium silicate solution. It is possible to make compound gels containing a plurality of metallic oxids supplied either in alkaline or in non-alkaline solution. When the gels are to be used as carriers of catalysts, the final dried gel is impregnated with a solution of a catalyst and then treated in known ways. To make a silver catalyst a dry gel can be simply impregnated with a dilute solution of silver nitrate, washed and dried. A copper catalyst can be made by the use of copper sulfate or chlorid. Vanadium catalysts, uranium catalysts, etc. can be made in a similar manner.

The following specific examples present typical embodiments of the methods of the present invention.

*Example I*

An A-gel is formed by stirring into a solution of sodium aluminate, containing 210 pounds of $Al_2O_3$ and 160 pounds of $Na_2O$ in 3200 gallons of water, a solution of 1472 pounds of commercial 40° Bé. sodium silicate (water glass) in 675 gallons of water, the water glass containing 129 pounds of $Na_2O$ and 423 pounds of $SiO_2$. These quantities form convenient batch sizes. The addition of the silicate solution to the aluminate solution is made in about three minutes and a uniform mixture is obtained by vigorous agitation before the gel starts to form. The stirring should be continued until gelation is complete and the gel starts to break, which requires about eight minutes. The gel is then allowed to stand for about two hours and is then well mixed with 6000 gallons of water, the mixture being agitated during the addition of the water which may require about 20 minutes. This suspension of the gel in water is allowed to stand for 5 or 6 hours and the gel settles during this time to approximately 5000 gallons. The supernatant liquid containing dissolved caustic soda with some silica is removed by decantation and the washing operation is then repeated with about 5000 gallons of water.

A B-gel is formed from 2208 pounds of water glass diluted with 1350 gallons of water and a solution in 1500 gallons of water of 486 pounds of commercial aluminum sulfate containing approximately 17 per cent of $Al_2O_3$ and 38 per cent $SO_3$. The aluminum sulfate solution is added slowly (in approximately 45 minutes) to the silicate solution with constant agitation until the pH of the gel mixture is 8.4. The partial addition of the sulfate solution leaves the gel mixture slightly alkaline preferably with a pH between 8.4 and 9.6. This mixture is allowed to stand for about 4 hours for ageing during which internal reactions are completed and then the aluminum sulfate solution is added to the gel with agitation until a pH value of 6 (slightly on the acid side) is reached. To the thus corrected B-gel is added two-thirds its volume of water with agitation during the water addition. The suspension of gel in the wash water is allowed to stand over night and the gel settles to approximately its original volume. The supernatant liquid containing dissolved sodium sulfate is then removed by decantation.

The A-gel and the B-gel are then cut-up, minced and pulped with continuous agitation in their respective container tanks and are then thoroughly mixed by pumping both gels simultaneously by means such as a single centrifugal pump to a storage tank in which the mixed gel is agitated continuously as by air jets. During this agitation the mixed gel is pumped to any suitable pressing device such as a filter press under a pressure of 50 pounds per square inch. The press cake is then dried, as by using a truck drier equipped with a circulating exhaust fan and steam coils. When this drier is loaded with the press cake the temperature may drop to about 40° C., from which figure it is gradually increased to about 80° C., in the course of 24 hours and by this time the material is apparently dry. It is then immersed in water and granulated in the usual way. The granulated dry gel is later screened and graded to proper size for use in a pervious bed water softener.

*Example II*

In the preparation of the first A-gel, 185 pounds of sodium aluminate are dissolved in 1600 gallons of water. A solution containing 736 pounds of water glass in 400 gallons of water is added to the first solution in three minutes, with vigorous stirring of the aluminate solution which effects a thorough mixing of the two solutions by the time the gel starts to form. Stirring is continued until gelation is complete and the gel starts to break (approximately 8 minutes), the stirring being accomplished by any suitab'e means such, for example, as an air lance.

After two hours ageing, the gel is well mixed with 3000 gallons of water. Five hours later, about 2400 gallons of supernatant liquid containing dissolved sodium salts, mostly caustic soda, are removed by decantation and 2400 gallons of water are added and mixed thoroughly with the settled gel. The following morning the supernatant liquid is removed by decantation. This gel is then ready for incorporating with other gels.

In the preparation of the second A-gel, 215 pounds of potassium aluminate are dissolved in 1600 gallons of water. A solution of 736 pounds of water glass in 400 gallons of water is added to the first solution in three minutes with vigorous stirring of the aluminate solution which effects a thorough mixing of the two solutions by the time the gel starts to form. The stirring is continued until gelation is complete and the gel starts to break (approximately 8 minutes). It is aged and washed as described for the above A type gel, prepared for incorporating with other gels.

In the preparation of the first B-gel, 2000 pounds of water glass are added to 1340 gallons of water. A second solution is prepared by dissolving 486 pounds of aluminum sulfate in 1500 gallons of water. The second solution is added slowly (in approximately 45 minutes) to the first until the pH of the gel mixture is 8.4. The mixture is stirred vigorously with an air lance during the period of addition. The gel is aged four hours to allow internal reactions time for completion and its reaction is adjusted to a pH of 6 by further addition of the aluminum sulfate solution. 2000 gallons of water are added to the corrected B-gel and well stirred.

The suspension of gel in water is allowed to stand over night, during which time the gel settles to approximately its original volume. The supernatant liquid containing dissolved sodium salts, mostly sodium sulfate, is removed by decantation. This gel is then ready for incorporating with other gels.

In the preparation of a second B-gel, 2000 pounds of water glass are added to 1340 gallons of water. The second solution is prepared by adding 75 gallons of 47° Bé. ferric sulfate solution to 1425 gallons of water. This solution contains 144 pounds ferric oxid ($Fe_2O_3$) and 175 pounds of $SO_3$, and is added slowly (in approximately 45 minutes) to the first solution until the pH of the gel mixture is 8.4. The gel is aged four hours to allow internal reactions time for completion and its reaction is adjusted to a pH of 6 by further addition of the ferric sulfate solution. The gel is washed as described for the above B-gel prepared from aluminum sulphate and water glass. This gel is then ready for incorporating with other gels.

These four washed gels are then pumped simultaneously into a storage tank with a single centrifugal pump. In the storage tank, the mixed gel is agitated continuously with a small amount of air.

This four-component gel is pressed, dried and granulated as described in the previous example.

From these two examples the principles embodied in the present invention are readily seen. It is to be noted that the A-gel is distinctly alkaline, carrying before washing about double the amount of soda ($Na_2O$) required for an equimolecular ratio of the alumina ($Al_2O_3$), while the B-gel although formed primarily in an alkaline medium is corrected after ageing to a slightly acid reaction by the further addition of a saline solution of a metal oxid, such as aluminum sulfate or ferric sulfate. In this correction to a slightly acid solution, the surfaces of the particles of the B-gel are made more acid than the interior of the particles and this condition facilitates a chemical reaction between these surfaces and the surfaces of the particles of the pulped A-gel after the mixture of the two gels.

Application of these principles is not limited to the formation of a compound gel from aluminate gels and sulfate gels. The A-gel can be formed from aluminum sulfate and a considerable excess of silicate so that this gel is highly alkaline and the B-gel can be formed as above described from a relatively larger amount of aluminum sulfate so that the gel is fairly acid (pH 4.0). A gel compounded from one or more alkaline gels and one or more acid gels is a desirable composition for use in water softening and for other purposes.

What I claim is:

1. As a new composition for water softening and other purposes an alkali alumino-silicate gel compounded from an alkaline artificial alumino-silicate gel and an artificial alumino-silicate gel non-alkaline at the time of compounding.

2. As a new composition for water softening and other purposes a compound silicate gel in dried granular form with each granule representing an admixture of artificial wet alkali alumino-silicate gels from different sources, one of the admixed gels being alkaline and another being superficially non-alkaline.

3. A compound base exchange silicate gel useful in water softening and for other purposes comprising a substantially homogeneous granular gel compounded of two wet gels made respectively from sodium silicate and sodium aluminate solutions and from sodium silicate and aluminum sulfate solutions, said latter gel being non-alkaline at the time of compounding.

4. A process of making a base exchange silicate gel which comprises gelling a mixture of sodium silicate solution with an alkaline solution of a metal oxid, gelling another solution of sodium silicate with an acidic solution of a metal oxid, the final relative proportion of said acidic solution being sufficient to leave the gel mixture in a non-alkaline condition, washing the two gels with water pulping and intimately mixing the two washed gels and drying and granulating the gel mixture.

5. The process of making a base exchange silicate gel which comprises gelling a mixture of sodium silicate and sodium aluminate solutions, gelling an alkaline mixture of sodium silicate and aluminum sulfate solutions, mixing aluminum sulfate solution with the second gel until the mixture has a pH value less than 7, mixing the two wet gels and drying the gel mixture.

6. In manufacturing base exchange silicate gels from alkali silicates and both alkali and acid metal oxid compounds, a process which comprises mixing solutions of alkali silicate and of an alkali compound of a metal oxid to form a jelly, mixing solutions of alkali silicate and of a compound of a metal oxid with an acid to form another jelly, the final relative proportion of the acid metal oxid compound being sufficient to leave the jelly in an non-alkaline condition, pulping and intimately mixing the two jellies, and drying and granulating the gel mixture.

7. In manufacturing base exchange silicate gels from alkali silicate and both alkali aluminates and aluminum salts, a process which comprises mixing solutions of alkali silicate and of alkali aluminate to form a jelly, mixing solutions of alkali silicate and non-alkaline aluminum salt to form another jelly, treating said second jelly with sufficient additional non-alkaline aluminum salt to leave the jelly with a pH below 7, pulping and intimately mixing the two jellies and drying and granulating the gel mixture.

8. In manufacturing base exchange silicate gels from alkali silicates and both alkali and acid alumina compounds, a process which comprises mixing solutions of sodium silicate and of sodium aluminate to form a jelly, mixing solutions of sodium silicate and of aluminum sulfate to form another jelly, adjusting the pH of the latter jelly with aluminum sulfate to a non-alkaline condition, pulping and intimately mixing the two jellies and drying and granulating the gel mixture.

9. In manufacturing base exchange silicate gels from alkali silicates and both alkali and acid compounds of metallic oxids, the process which comprises mixing solutions of alkali silicate and of an alkali compound of a metal oxid to form a jelly, mixing solutions of alkali silicate and of an acid compound of a metal oxid to form another jelly, adjusting the pH of this jelly to a non-alkaline condition, pulping and intimately mixing the two jellies, pressing and drying and granulating the gel mixture.

10. A process of making a base exchange silicate gel which comprises gelling of a mixture of sodium silicate solution with an alkaline solution of a metal oxid, gelling another solution of sodium silicate with an acid solution of a metal oxid, the final relative proportion of said acid solution being sufficient to leave the gel mixture in a non-alkaline condition, washing each gel, pulping and intimately mixing the two gels, and drying and granulating the gel mixture.

11. The process of making base exchange silicate, which comprises gelling a mixture of an alkaline silicate and an alkaline aluminate solution, gelling an alkaline mixture of alkali silicate and acid metal salt solutions, mixing an acid metal salt solution with the second gel until the mixture has a pH value of less than 7, mixing the two wet gels and pressing and drying the gel mixture.

In testimony whereof, I have hereunto affixed my signature.

RAY RILEY.